United States Patent
Batni et al.

(10) Patent No.: US 7,120,419 B2
(45) Date of Patent: Oct. 10, 2006

(54) GENERATING ONE OR MORE TRIGGERED OPERATIONS TO PREPAID SERVICE NODE BASED ON CONNECTION WITH INTELLIGENT PERIPHERAL COMPONENT

(75) Inventors: Ramachendra P. Batni, Phoenix, AZ (US); Kenneth W. Del Signore, North Aurora, IL (US); Michael J. Rudolph, Naperville, IL (US); Yile Enoch Wang, Freehold, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 231 days.

(21) Appl. No.: 10/736,256

(22) Filed: Dec. 15, 2003

(65) Prior Publication Data

US 2005/0130624 A1    Jun. 16, 2005

(51) Int. Cl.
*H04M 11/00*    (2006.01)

(52) U.S. Cl. .................... 455/406; 455/445; 379/114.2

(58) Field of Classification Search ............. 455/432.1, 455/558, 406, 408, 414.1, 445; 379/114.05, 379/114.06, 114.2
See application file for complete search history.

(56) References Cited

U.S. PATENT DOCUMENTS

| | | | |
|---|---|---|---|
| 6,070,067 A * | 5/2000 | Nguyen et al. ............. 455/407 |
| 6,226,364 B1 * | 5/2001 | O'Neil .................... 379/114.2 |
| 6,397,055 B1 * | 5/2002 | McHenry et al. ........... 455/408 |
| 6,684,072 B1 * | 1/2004 | Anvekar et al. .......... 455/432.1 |
| 6,788,927 B1 * | 9/2004 | Pohutsky et al. ........... 455/406 |
| 6,816,721 B1 * | 11/2004 | Rudisill ..................... 455/406 |
| 6,829,473 B1 * | 12/2004 | Raman et al. .............. 455/406 |
| 6,937,850 B1 * | 8/2005 | Lippelt ...................... 455/408 |
| 6,975,852 B1 * | 12/2005 | Sofer et al. ................. 455/408 |
| 2005/0164707 A1 * | 7/2005 | Batni et al. ................. 455/445 |

* cited by examiner

*Primary Examiner*—CongVan Tran

(57) ABSTRACT

A mobile switching center of an apparatus in one example generates one or more triggered operations to a prepaid service node based on a connection with an intelligent peripheral component.

23 Claims, 5 Drawing Sheets

GENERATING ONE OR MORE TRIGGERED OPERATIONS TO PREPAID SERVICE NODE BASED ON CONNECTION WITH INTELLIGENT PERIPHERAL COMPONENT

TECHNICAL FIELD

The invention relates generally to communications and more particularly to billing for prepaid telecommunications.

BACKGROUND

In a telecommunication network, a user associated with a prepaid mobile communication device may fund an account balance employable for subsequent telecommunication service. For example, the telecommunication network provides the prepaid mobile communication device with prepaid telecommunication service. A prepaid service node maintains the account balance for the prepaid mobile communication device. For example, the prepaid service node calculates billing information for telecommunication service used by the prepaid mobile communication device. The billing information in one example comprises an amount to deduct from the account balance associated with the prepaid mobile communication device. The prepaid mobile communication device in one example is connected with a destination location on a telephone call for a duration. The prepaid service node calculates the amount to deduct from the account balance based on the destination location and duration of the telephone call.

The telecommunication network may offer additional services in addition to supporting telephone calls. For example, the telecommunication network may offer directory information, weather reports, horoscopes, and/or stock quotes through connection with one or more service nodes. The telecommunication network in one example connects mobile communication devices to the service nodes upon receipt of specific dialed number strings from the mobile communication devices.

If the telecommunication network attempts to connect the prepaid mobile communication device with the service node, the prepaid service node may not receive sufficient information to properly bill for the use of the service node. As one shortcoming, the prepaid service node may be unable to deduct an appropriate amount from the account balance associated with the prepaid mobile communication device based on use of the service node. For example, if the dialed number string from the prepaid mobile communication device doesn't provide the prepaid service node with complete billing parameters, then the prepaid service node may not be able to properly bill the prepaid mobile communication device for the use of the service node.

Thus, a need exists for a telecommunication network that serves to properly bill a prepaid mobile communication device for use of service nodes.

SUMMARY

The invention in one embodiment encompasses an apparatus. The apparatus comprises a mobile switching center that generates one or more triggered operations to a prepaid service node based on a connection with an intelligent peripheral component.

Another embodiment of the invention encompasses a method. A prepaid service node is connected with an intelligent peripheral component. One or more service identifications are sent in a triggered operation to a prepaid service node for billing the prepaid mobile communication device for connection with the intelligent peripheral component.

Yet another embodiment of the invention encompasses an article. The article comprises one or more computer-readable signal-bearing media. The article comprises means in the one or more media for connecting a prepaid service node with an intelligent peripheral component. The article comprises means in the one or more media for sending one or more service identifications in a triggered operation to a prepaid service node for billing the prepaid mobile communication device for connection with the intelligent peripheral component.

DESCRIPTION OF THE DRAWINGS

Features of exemplary implementations of the invention will become apparent from the description, the claims, and the accompanying drawings in which:

DETAILED DESCRIPTION

Figure 1:
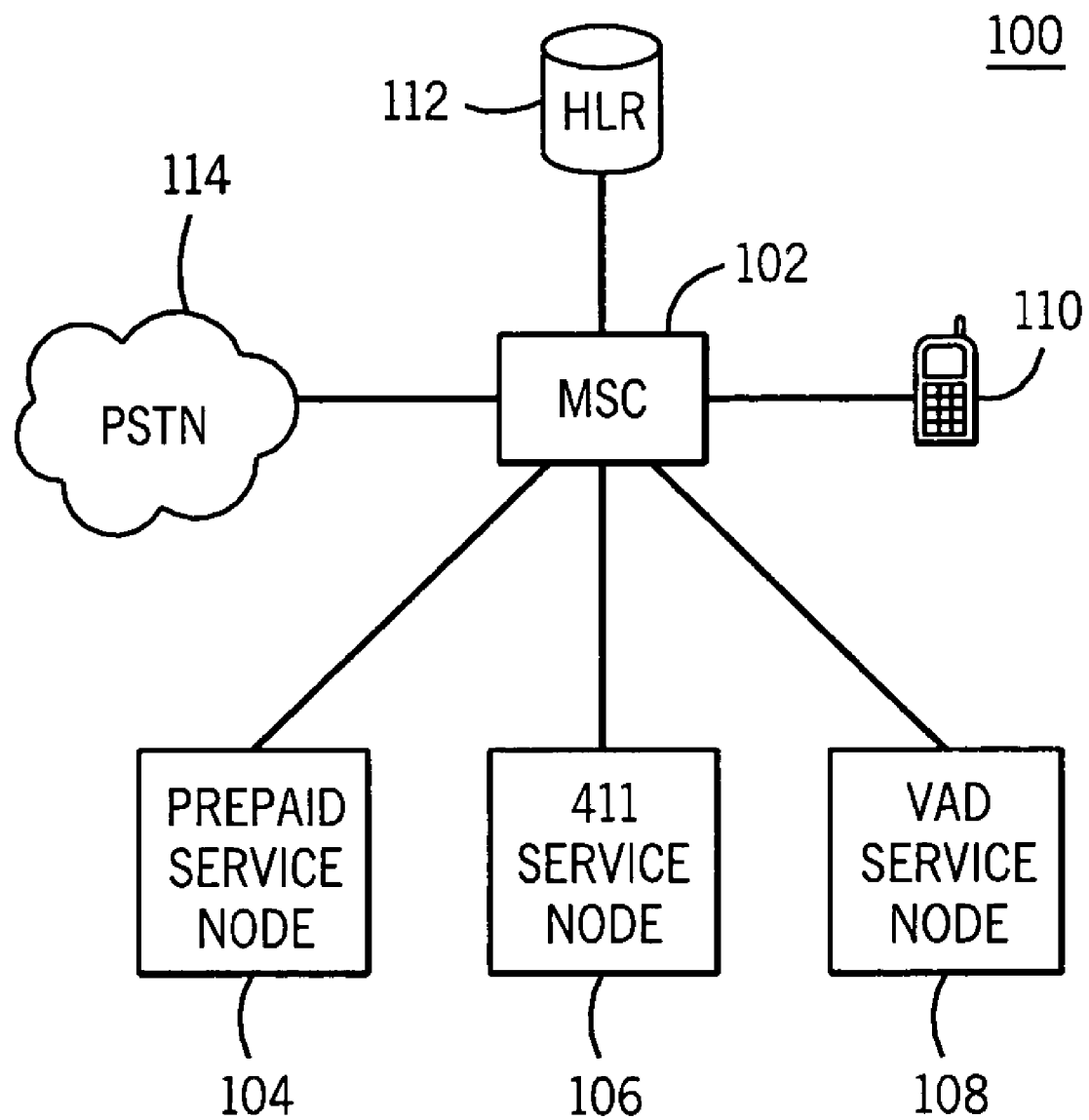
FIG. 1 is a representation of an exemplary implementation of an apparatus that comprises one or more mobile switching centers, one or more prepaid service nodes, one or more service nodes, one or more prepaid mobile communication devices, one or more home location registers, and one or more public switched telephone networks.

Turning to FIG. 1, an apparatus 100 in one example comprises one or more mobile switching centers ("MSCs") 102, one or more prepaid service nodes 104, one or more service nodes 106 and 108, one or more prepaid mobile communication devices 110, one or more home location registers ("HLRs") 112, and one or more public switched telephone networks ("PSTNs") 114. The apparatus 100 illustrates a use of mobile switching center and other wireless network element (e.g., the home location register 112) operations, in accordance with, and in addition to American National Standards Institute ("ANSI-41") and Wireless Intelligent Network ("WIN") standards, to provide a charging capability for transactions with the service nodes 106 and 108.

The mobile switching center 102 supports an air interface with the prepaid mobile communication device 110. The mobile switching center 102 in one example comprises a serving mobile switching center. The mobile switching center 102 serves to connect the prepaid mobile communication device 110 with one or more termination endpoints during a communication session. In one example, the mobile switching center 102 connects the prepaid mobile communication device 110 with the public switched telephone network 114. In another example, the mobile switching center 102 connects the prepaid mobile communication device 110 with one or more of the service nodes 106 and 108.

The service nodes 106 and 108 in one example each comprise an intelligent peripheral component ("IP") and a service control point ("SCP"). The service nodes 106 and 108 provide services to the prepaid mobile communication device 110. For example, the prepaid mobile communication device 110 incurs a fee during use of the service nodes 106 and 108 and the prepaid service node 104 may bill the prepaid mobile communication device 110 for using the services. To facilitate billing the prepaid mobile communication device 110 for use of the services, the service nodes 106 and 108 send service identifications that are associated with the service nodes 106 and 108 to the mobile switching center 102 to indicate the use of the services during a communication session. The mobile switching center 102 will store the service identifications for later delivery to the prepaid service node 104.

If the mobile switching center 102 receives a service identification that does not match a prearranged value, then the mobile switching center 102 will record the service identification in automatic message accounting ("AMA") records. Thus, the mobile switching center 102 compiles a list of all received service identifications during the communication session. Then, the mobile switching center 102 may later send the list of received service identifications to the prepaid service node 104. The list of received service identifications is employable by the prepaid service node 104 to calculate billing information based on use of the service nodes 106 and 108 by the prepaid mobile communication device 110. For example, the service nodes 106 and 108 may communicate the service identifications to the prepaid service node 104 without requiring the service nodes 106 and 108 to know which subscribers are prepaid subscribers.

The prepaid service node 104 handles billing for services used by the prepaid mobile communication device 110 during a communication session. The prepaid service node 104 employs the service identifications, billing rates, and call durations to calculate billing information for the communication session. The billing information in one example comprises an amount to deduct from an account balance associated with the prepaid mobile communication device 110. The prepaid service node 104 in one example sends service identifications to the mobile switching center 102 to indicate a service provided to the prepaid mobile communication device 110.

The service nodes 106 and 108 provide one or more services to the prepaid mobile communication device 110 during a communication session. The service nodes 106 and 108 in one example provide one or more of a directory assistance service (e.g., 411 service), a voice activated dialing ("VAD") service, a horoscope service, a weather report service, a stock quote service, a virtual private network service, and the like. In one example, the service nodes 106 and 108 comprise a directory assistance service node 106 and a voice activated dialing service node 108.

The prepaid mobile communication device 110 in one example accesses the directory assistance service node 106 by a specific digit string. In one example, a user of the prepaid mobile communication device 110 dials the digit string. In another example, the voice activated dialing service node 108 provides the digit string upon a request from the user of the prepaid mobile communication device 110. In one example, the directory assistance service node 106 provides directory assistance services as well as additional services. For example, the directory assistance service node 106 may support the horoscope service, the weather report service, and the stock quote service. The directory assistance service node 106 in one example employs a different service identification for each of the supported services to be able to indicate use of a plurality of the services. For example, the directory assistance service node 106 sends one or more different service identifications to the mobile switching center 102 to indicate which of the supported services were used by the prepaid mobile communication device 110 on the communication session. Thus, the mobile switching center 102 can pass the one or more different service identifications to the prepaid service node 104 for billing the prepaid mobile communication device 110.

The prepaid mobile communication device 110 in one example comprises a mobile telephone with an associated prepaid telephone service account. The prepaid telephone service account comprises an account balance used to fund subsequent telecommunication service. The home location register 112 stores subscription properties for the prepaid mobile communication device 110. Upon registration of the prepaid mobile communication device 110 with the mobile switching center 102, the home location register 112 communicates one or more portions of the subscription properties to the mobile switching center 102. The mobile switching center 102 employs the subscription properties for communication session setup.

Figure 2:
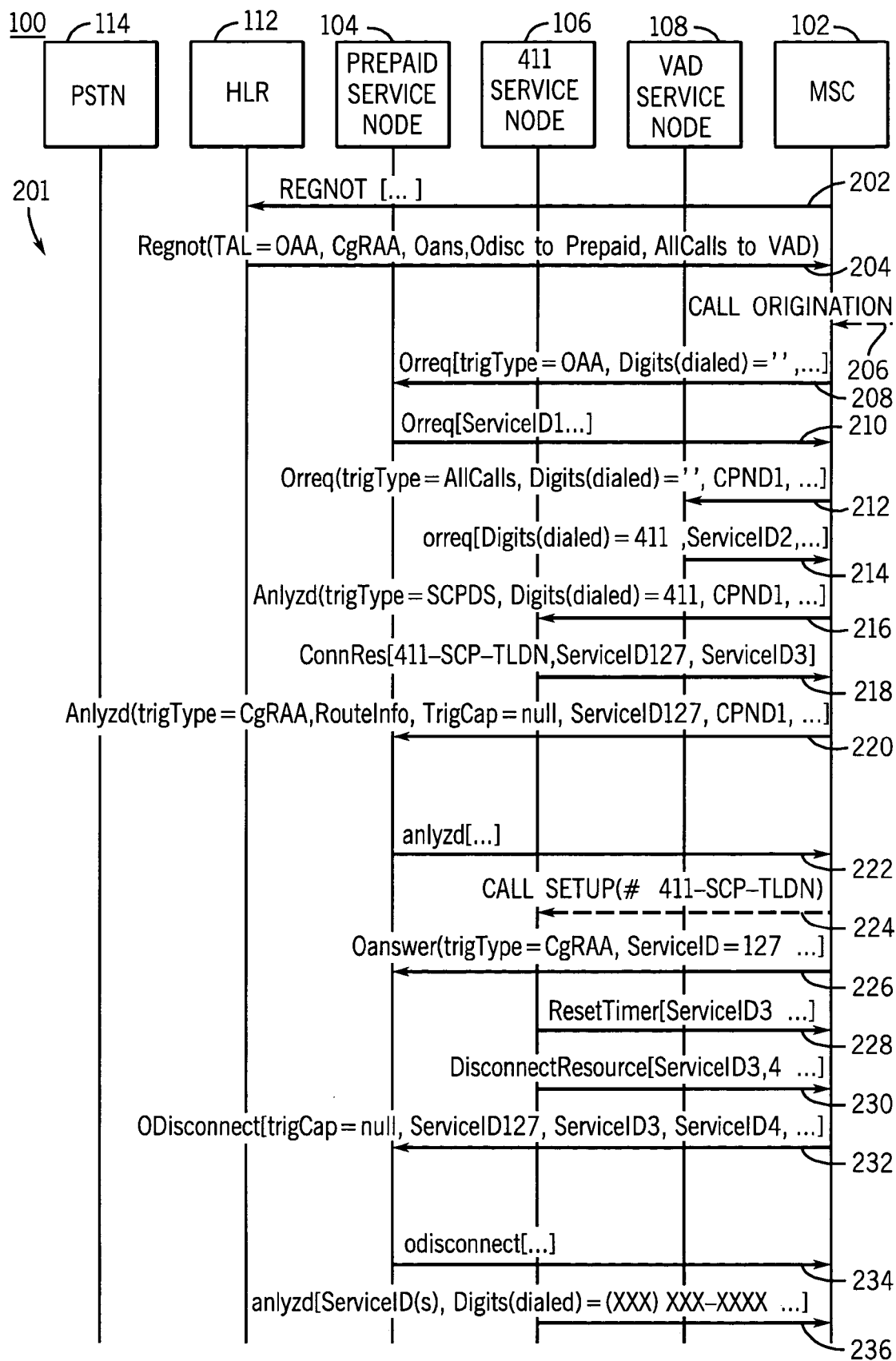
FIG. 2 is a representation of one exemplary message flow for use of one or more of the one or more service nodes by a prepaid mobile communication device of the one or more prepaid mobile communication devices of the apparatus of FIG. 1.

Referring to FIGS. 1–2, an illustrative description of one exemplary operation of the apparatus 100 is now presented, for explanatory purposes. A message flow 201 represents an exemplary use of one or more of the service nodes 106 and 108 by the prepaid mobile communication device 110 in a communication session. The message flow 201 illustrates the mobile switching center 102 sending to the prepaid service node 104 one or more service identifications that are associated with the one or more of the service nodes 106 and 108 used by the prepaid mobile communication device 110.

Upon registration of the prepaid mobile communication device 110 with the mobile switching center 102, the mobile switching center 102 sends a registration notification message 202 to the home location register 112. "REGNOT" serves to represent the registration notification message 202. The home location register 112 determines that the prepaid mobile communication device 110 employs prepaid telecommunication service and arms one or more triggers (e.g., subscriber triggers) for the communication session. The home location register 112 arms the triggers for both interactions with the service nodes 106 and 108 and also for the call to the eventual destination (XXX) XXX-XXXX. The mobile switching center 102 may encounter the triggers for both the interaction with the service nodes 106 and 108 and the call to the eventual destination (XXX) XXX-XXXX. The mobile switching center 102 may encounter the triggers a plurality of times for a plurality of trasactions with the service nodes 106 and 108.

The home location register 112 in one example arms subscriber triggers for the prepaid telecommunication service and voice activated dialing service. To arm the triggers, the home location register 112 sends a registration notification return result message 204 to the mobile switching center 102. "Regnot" serves to represent the registration notification return result message 204. The registration notification return result message 204 comprises a TriggerAddressList ("TAL"). The TriggerAddressList comprises Origination- _Attempt_Authorized ("OAA"), Calling_Routing_Addresss_Available ("CgRAA"), OAnswer, and ODisconnect triggers. The home location register 112 sets the triggers in the TriggerAddressList to send information to the prepaid service node 104 upon activation. The registration notification return result message 204 also comprises an All_Calls trigger set to send information to the voice activated dialing service node 108 upon activation.

Upon an origination 206 of a call by the prepaid mobile communication device 110, the mobile switching center 102 sends an OAA origination request 208 to the prepaid service node 104. "Orreq" serves to represent the OAA origination request 208. The OAA origination request 208 comprises the trigger type, an identification of the prepaid mobile communication device 110, and the digits dialed to initiate the call. To initiate the call in one example the user of the prepaid mobile communication device 110 presses send without dialing other digits. "Digits (dialed)=' '" serves to represent the user of the prepaid mobile communication device 110 pressing send without dialing other digits. Thus, the digits dialed does not provide the prepaid service node 104 with an indication of the destination of the call. For example, the digits dialed value does not provide the prepaid service node 104 with a complete indication of one or more billable activities of the communication session.

Upon receipt of the OAA origination request 208, the prepaid service node 104 determines that the account balance associated with the prepaid mobile communication device 110 contains sufficient funds to allow the call to proceed. Thus, the prepaid service node 104 sends an origination request return result 210 to the mobile switching center 102. "Orreq" serves to represent the origination request return result 210. The origination request return result 210 comprises a service identification to indicate to the mobile switching center 102 that the prepaid service node 104 is involved on the communication session. For example, the prepaid service node 104 provides prepaid service to the prepaid mobile communication device 110. "ServiceID1" serves to represent the service identification associated with the prepaid service node 104.

Upon receipt of the origination request return result 210, the mobile switching center 102 sends an All_Calls origination request 212 to the voice activated dialing service node 108. The All_Calls origination request 212 comprises the trigger type, an identification of the prepaid mobile communication device 110 (e.g., Mobile Subscriber Identity "MSID"), and the digits dialed to initiate the call. The All_Calls origination request 212 involves the voice activated dialing service node 108 on the communication session. For example, the user of the prepaid mobile communication device 110 desires to employ directory assistance to locate a telephone number for a destination of the communication session. Thus, the user of the prepaid mobile communication device 110 in one example says "directory assistance" to the voice activated dialing service node 108.

The voice activated dialing service node 108 sends a origination request return result 214 to the mobile switching center 102. The origination request return result 214 indicates to the mobile switching center 102 that the dialed digits represent directory assistance digits (e.g., 411). The origination request return result 214 comprises a service identification to indicate to the mobile switching center 102 that the voice activated dialing service node 108 is involved on the communication session. For example, the voice activated dialing service node 108 provides voice activated dialing service to the prepaid mobile communication device 110. "ServiceID2" serves to represent the service identification associated with the voice activated dialing service node 108.

Upon receipt of the origination request return result 214, the mobile switching center 102 looks at the digits dialed parameter and determines to involve the directory assistance service node 106. For example, the SpecificCalledDigitString of the origination request return result 214 is 411. Thus, the mobile switching center 102 sends an AnalyzedInformation message 216 to the directory assistance service node 106.

Once the directory assistance service node 106 gains control of the communication session, the directory assistance service node 106 may send a ConnectResource message 218 to the mobile switching center 102. The ConnectResource message 218 directs the mobile switching center 102 to set up a temporary intermediate connection (e.g., a trunk) with the prepaid service node 104. The ConnectResource message 218 affords the directory assistance service node 106 the ability to release the trunk after servicing the transaction. The prepaid service node 104 can provide customized announcements and interactions to the prepaid mobile communication device 110 through the connection. The ConnectResource message 218 comprises a first service identification to indicate to the mobile switching center 102 that the directory assistance service node 106 is involved on the communication session. For example, the prepaid service node 104 provides directory assistance service to the prepaid mobile communication device 110. "ServiceID3" serves to represent the first service identification associated with the directory assistance service node 106.

In one example, the ConnectResource message 218 comprises a second service identification to indicate to the mobile switching center 102 that triggers (e.g., CgRAA, Oanswer and Odisconnect) for the communication session apply to the transaction with the service nodes 106 and 108. "ServiceID127" serves to represent the second service identification that indicates that triggers for the communication session apply to the transaction with the service nodes 106 and 108. The second service identification serves to activate triggers for events in the transaction with the service nodes 106 and 108. In another example, the mobile switching center 102 is pre-provisioned to activate the triggers for the transaction with the service nodes 106 and 108.

Since the CgRAA trigger was armed at the mobile switching center 102 via pre-provisioning, or due to recognition of the "ServiceID127", upon encountering the CgRAA trigger, the mobile switching center 102 sends an AnalyzedInformaton operation 220 to the destination provisioned in the registration notification return result message 204. For example, the mobile switching center 102 sends the AnalyzedInformaton operation 220 to the prepaid service node 104. The AnalyzedInformaton operation 220 communicates to the prepaid service node 104 that a call is being set up to the directory assistance service node 106. The AnalyzedInformaton operation 220 comprises RoutingDigits so that the prepaid service node 104 may calculate rating for the call to the directory assistance service node 106. For example, the call to the directory assistance service node 106 may comprise a 411 call or a (XXX) 555-1212 call. Thus, the call may be rated differently based on type of call. In one example, the 411 call may be charged a $0.95 service fee and also be charged for a thirty-five second local call. In another example, the (XXX) 555-1212 call may be charged the same a $0.95 service fee, and also be charged for a thirty-five second long distance call. The AnalyzedInformaton operation 220 passes the ServiceID127 to the prepaid service node 104 to distinguish the intelligent peripheral call from a standard call.

Upon receipt of the AnalyzedInformaton operation 220, the prepaid service node 104 sends an anlyzd return result message 222 to the mobile switching center 102 to allow the call to continue to the directory assistance service node 106. The mobile switching center 102 will then set up a call 224 to the digits of the directory assistance service node 106 specified in the ConnectResource message 218. The directory assistance service node 106 will locate a telephone number based on an inquiry from the user of the prepaid mobile communication device 110. "(XXX) XXX-XXXX" serves to represent the telephone number.

After the call 224 is answered, then the mobile switching center 102 encounters the OAnswer trigger 226. The mobile switching center 102 sends the OAnswer trigger 226 to the destination provisioned in the registration notification return result message 204. For example, the mobile switching center 102 sends the OAnswer trigger 226 to the prepaid service node 104. The OAnswer trigger 226 communicates to the prepaid service node 104 that a call to the directory assistance service node 106 has been answered. The OAnswer trigger 226 passes the ServiceID127 to the prepaid service node 104 to distinguish the intelligent peripheral call from a standard call.

If additional time is necessary for the connection with the directory assistance service node 106, the directory assistance service node 106 may send a ResetTimer 228 to the mobile switching center 102. The ResetTimer 228 allows another thirty seconds for the connection between the mobile switching center 102 and the directory assistance service node 106. The ResetTimer 228 comprises a service identification to indicate to the mobile switching center 102 that the ResetTimer 228 was activated for the connection with the directory assistance service node 106. "ServiceID3" serves to represent the service identification associated with the ResetTimer 228 and can also be used to identify an additional service provided to the prepaid mobile communication device 110. For example, the prepaid mobile communication device 110 may receive a horoscope before requesting for directory assistance from the directory assistance service node 106.

The directory assistance service node 106 sends a DisconnectResource message 230 to the mobile switching center 102. The DisconnectResource message 230 serves to release the connection between the mobile switching center 102 and the directory assistance service node 106. The DisconnectResource message 230 may comprise one or more service identifications that indicate to the mobile switching center 102 services used by the prepaid mobile communication device 110. "ServiceID3,4" serves to represent the one or more service identifications.

Upon encountering the Odisconnect trigger 232, the mobile switching center 102 sends the Odisconnect trigger 232 to the destination provisioned in the registration notification return result message 204. For example, the mobile switching center 102 sends the Odisconnect trigger 232 to the prepaid service node 104. The Odisconnect trigger 232 communicates to the prepaid service node 104 that the call to the directory assistance service node 106 has been disconnected. The Odisconnect trigger 232 passes the ServiceID127 to the prepaid service node 104 to distinguish the intelligent peripheral call from a standard call.

The mobile switching center 102 includes the service identifications in the Odisconnect trigger 232 to the prepaid service node 104. The Odisconnect trigger 232 sends an indication of the services used by the prepaid mobile communication device 110. For example, the Odisconnect trigger 232 may comprise one or more of ServiceID1, ServiceID2, ServiceID3, and ServiceID4. The prepaid service node 104 employs the service identifications to calculate billing information based on the use of the one or more service nodes 106 and 108 by the prepaid mobile communication device 110. The Odisconnect trigger 232 may indicate one or more billing parameters, such as, the service identifications, one or more billing rates, and one or more call durations. For example, the Odisconnect trigger 232 may provide an indication to the prepaid service node 104 of a duration of the connections with the service nodes 106 and 108. The prepaid service node 104 calculates an amount to deduct from an account balance associated with the prepaid mobile communication device 110.

The prepaid service node 104 sends an Odisconnect return result 234 to the mobile switching center 102 to allow the call to continue at the mobile switching center 102. In response to the inquiry from the user of the prepaid mobile communication device 110, the directory assistance service node 106 sends an anlyzd return result message 236 to the mobile switching center 102. The anlyzd return result message 236 comprises an indication of the telephone number (XXX) XXX-XXXX. The anlyzd return result message 236 closes the transaction started by the AnalyzedInformaton operation 220. The anlyzd return result message 236 comprises parameters to change the destination digits, thereby redirecting the call to the telephone number (XXX) XXX-XXXX.

Figure 3:
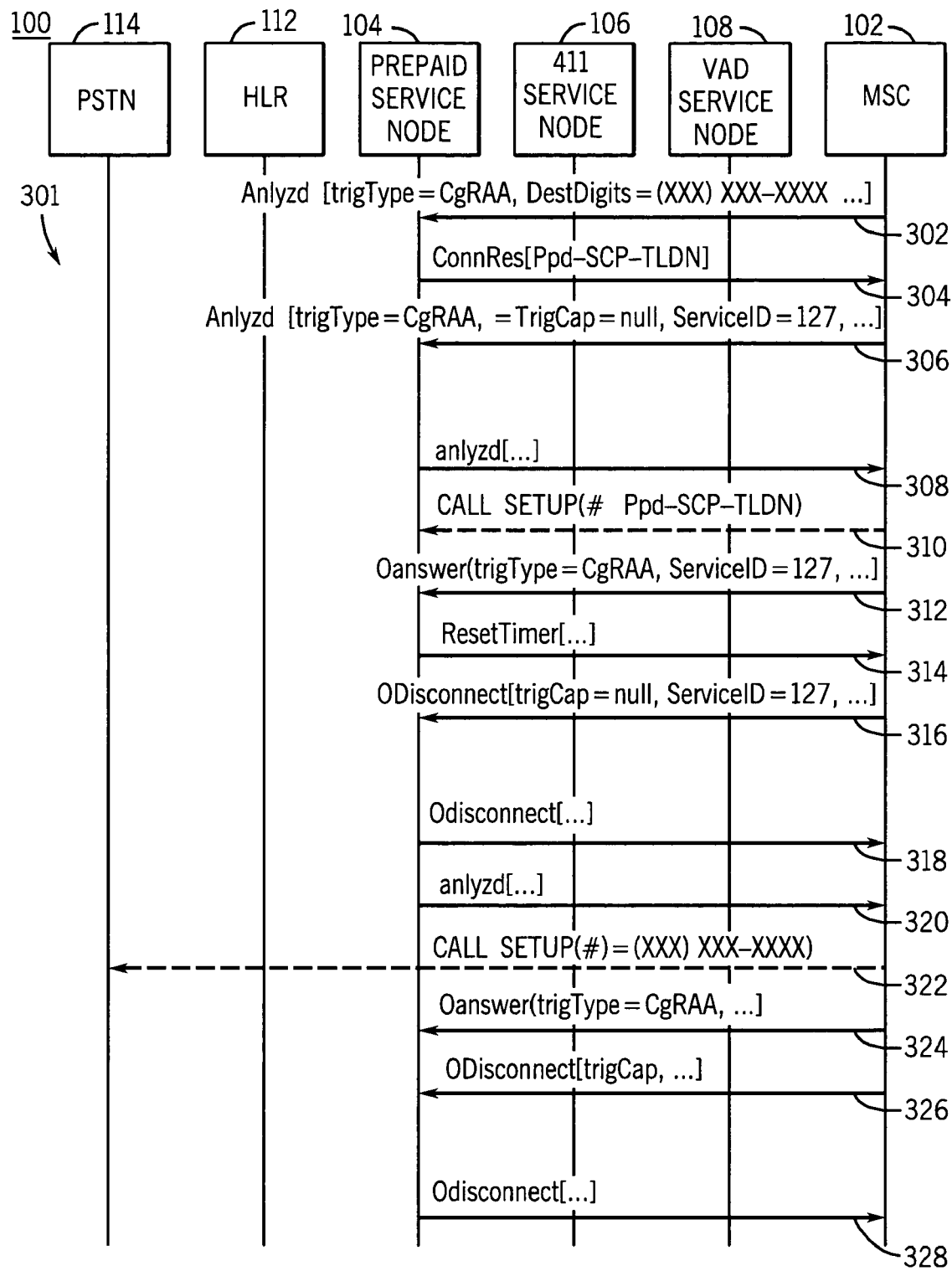
FIG. 3 is a representation of one exemplary message flow for a connection of a prepaid mobile communication device of the one or more prepaid mobile communication devices with a location associated with destination digits received from a directory assistance service node of the one or more service nodes of the apparatus of FIG. 1.

Referring to FIGS. 1 and 3, a message flow 301 represents an exemplary connection of the prepaid mobile communication device 110 with a location associated with the destination digits received from the directory assistance service node 106. The message flow 301 continues where the message flow 201 (FIG. 2) ended. For example, the transactions with the service nodes 106 and 108 have ended and the call is ready to be setup to the destination digits.

In order to charge every call, the CgRAA trigger 302 is armed at the mobile switching center 102 for delivery to the prepaid service node 104. The CgRAA trigger 302 comprises routing information parameters, such as the destination digits (XXX) XXX-XXXX. The prepaid service node 104 employs the routing information parameters to properly rate the call. For example, the prepaid service node 104 employs the routing information parameters to calculate billing information associated with the call. The CgRAA trigger 302 gives the prepaid service node 104 control of the call.

Once the prepaid service node 104 gains control of the call, the prepaid service node 104 may send a ConnectResource message 304 to the mobile switching center 102. The ConnectResource message 304 directs the mobile switching center 102 to set up a temporary connection to the prepaid service node 104. The connection with the prepaid service node 104 provides the prepaid mobile communication device 110 with customized balance announcements and interactions.

In one example, upon receipt of the ConnectResource message 304, the mobile switching center 102 sends a CgRAA trigger 306 to the prepaid service node 104. The prepaid service node 104 sends an anlyzd return result message 308 to the mobile switching center 102 to allow the mobile switching center 102 to continue the call. In another example, the mobile switching center 102 determines to not send the CgRAA trigger 306. For example, the mobile switching center 102 may determine to not send the CgRAA trigger 306 because the CgRAA trigger 306 would be communicating information already known by the prepaid service node 104 back to the prepaid service node 104.

To determine whether to send the CgRAA trigger 306, the mobile switching center 102 in one example compares the TAL destination for the CgRAA trigger that was received in the registration notification return result message 204 (FIG. 2) and the address for the trigger that encapsulates the CgRAA trigger 306. For example, the mobile switching center 102 compares an address associated with a received service identification and a trigger destination address for a destination to send the received service identification. If the address associated with the service identification is the same as the trigger destination address, then the mobile switching center 102 determines to not send the service identification to the trigger destination address. If the trigger address of a trigger matches the TriggerAddress of the trigger as armed in the TAL, then the mobile switching center 102 does not send the trigger to the TriggerAddress. For example, if the CgRAA trigger 306 is communicating information from the prepaid service node 104 through the mobile switching center 102 and back to the prepaid service node 104, then the mobile switching center 102 could avoid sending the OAnswer trigger 312 and the ODisconnect trigger 316.

To connect with the prepaid service node 104, the mobile switching center 102 sets up a call 310 to the prepaid service node 104. For example, the prepaid service node 104 plays prepaid pre-call announcement balance and account options for the prepaid mobile communication device 110 through the mobile switching center 102. After the call 310 is answered, the mobile switching center 102 encounters the OAnswer trigger 312. The mobile switching center 102 sends the OAnswer trigger 312 to the destination provisioned in the registration notification return result message 204 (FIG. 2). For example, the mobile switching center 102 sends the OAnswer trigger 312 to the prepaid service node 104. The OAnswer trigger 312 communicates to the prepaid service node 104 that the call 310 has been answered.

If additional time on the connection with the prepaid service node 104 is necessary, the prepaid service node 104 may send a ResetTimer 314 to the mobile switching center 102. The ResetTimer 314 allows another thirty seconds for the ConnectResource message 304 connection. Also, the ResetTimer 314 may also be sent with a ServiceID to indicate use of an additional service by the prepaid mobile communication device 110.

After the call 310 to the prepaid service node 104 is disconnected, then the mobile switching center 102 encounters the ODisconnect trigger 316. The mobile switching center 102 sends the ODisconnect trigger 316 to the destination provisioned in the registration notification return result message 204 (FIG. 2). For example, the mobile switching center 102 sends the ODisconnect trigger 316 to the prepaid service node 104. The ODisconnect trigger 316 communicates to the prepaid service node 104 that the call to the prepaid service node 104 has been disconnected. Any service identifications received at the mobile switching center 102 during the connection with the prepaid service node 104 are sent to the prepaid service node 104 in the ODisconnect trigger 316. For example, the ODisconnect trigger 316 comprises the ServiceID127 so that the prepaid service node 104 can bill for the service associated with ServiceID127. If the OAnswer trigger 312 and the ODisconnect trigger 316 are communicating information from the prepaid service node 104 through the mobile switching center 102 and back to the prepaid service node 104, then the mobile switching center 102 could avoid sending the OAnswer trigger 312 and the ODisconnect trigger 316.

Upon receipt of the ODisconnect trigger 316, the prepaid service node 104 sends an Odisconnect return result 318 to the mobile switching center 102 to allow the call to continue at the mobile switching center 102. The prepaid service node 104 is done playing announcements for the prepaid mobile communication device 110. Thus, the prepaid service node 104 sends an anlyzd return result message 320 to the mobile switching center 102. The anlyzd return result message 320 closes the transaction with the prepaid service node 104 started by the CgRAA trigger 302. The anlyzd return result message 320 may comprise parameters to affect the service identifications recorded in the AMA record of the mobile switching center 102.

The anlyzd return result message 320 returns control of the communication session to the mobile switching center 102. The mobile switching center 102 sets up a call 322 to the location associated with the destination digits (XXX) XXX-XXXX. For example, the mobile switching center 102 sends the call 322 out to the public switched telephone network 114. The public switched telephone network 114 delivers the call to a location associated with the destination digits (XXX) XXX-XXXX. Once the call 322 is answered, the mobile switching center 102 sends an Oanswer trigger 324 to the prepaid service node 104. Once the call 322 is disconnected, the mobile switching center 102 sends an ODisconnect trigger 326 to the prepaid service node 104. The Oanswer trigger 324 and the Odisconnect trigger 326 allow the prepaid service node 104 to charge for the call 322 to (XXX) XXX-XXXX. Upon receipt of the Odisconnect trigger 326, the prepaid service node 104 sends an Odisconnect return result message 328 to the mobile switching center 102 to end the triggered transactions.

Figure 4:
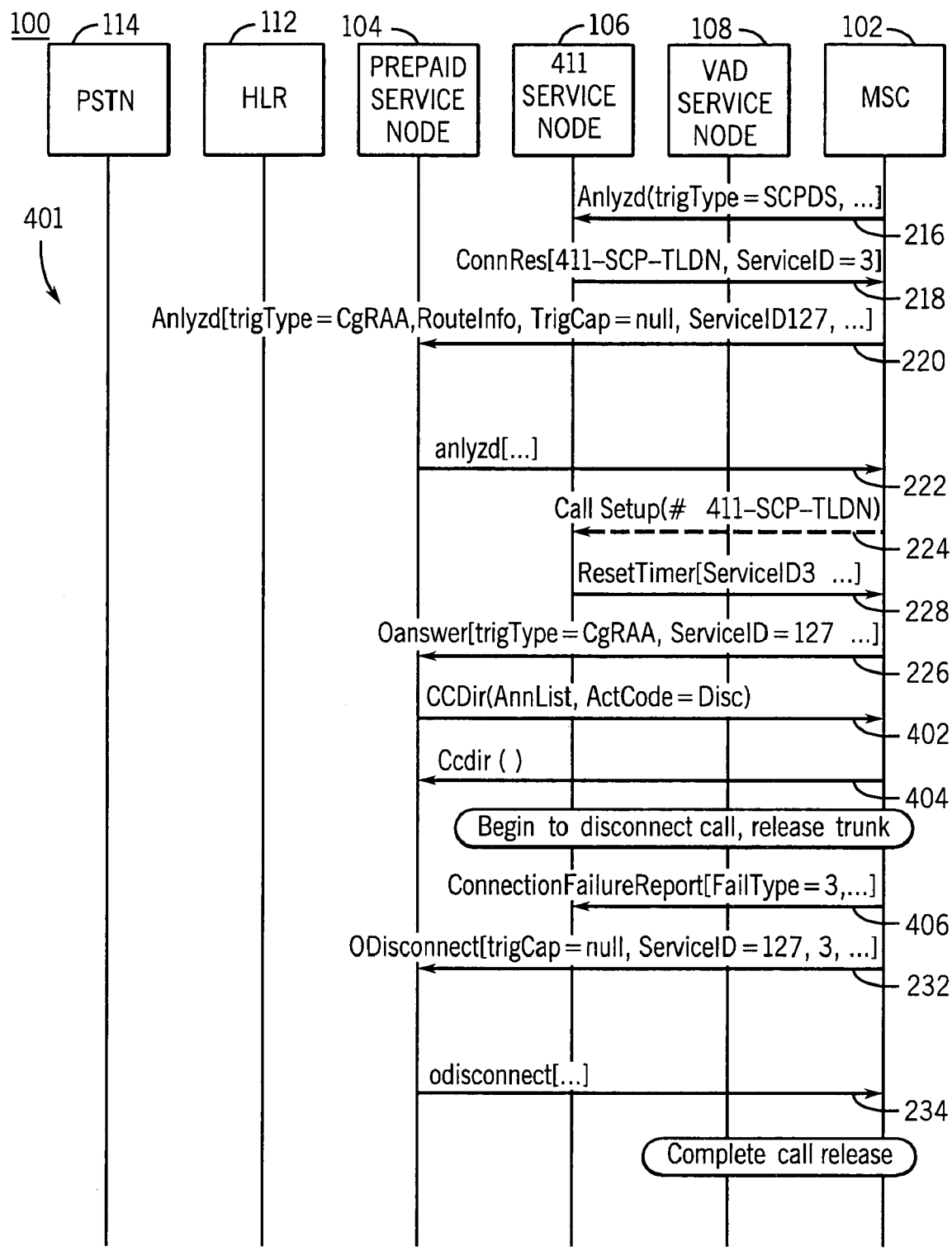
FIG. 4 is a representation of one exemplary message flow for teardown of a call that involves a prepaid mobile communication device of the prepaid mobile communication devices of the apparatus of FIG. 1.

Referring to FIGS. 1 and 4, a message flow 401 represents an exemplary teardown of a call that involves the prepaid mobile communication device 110. The message flow 401 also illustrates sending to the prepaid service node 104 a service identification associated with the directory assistance service node 106. The message flow 401 illustrates registration, communication session setup, and use of the directory assistance service node 106 analogously to the message flow 201 (FIG. 2).

To end the communication session, the prepaid service node 104 may send a call termination request 402 to the mobile switching center 102. For example, the account balance associated with the prepaid mobile communication device 110 may reach zero and the prepaid service node 104 may end the communication session. The call termination request 402 in one example comprises a call control directive. "CCDir" serves to represent the call termination request 402.

Upon receipt of the call termination request 402, the mobile switching center 102 sends a call termination confirmation 404 to the prepaid service node 104. Then, the mobile switching center 102 sends a connection failure report 406 to the directory assistance service node 106 to indicate the reason for termination. The mobile switching center 102 also encounters an Odisconnect trigger 232 and sends the ODisconnect trigger 232 to the prepaid service node 104 to pass one or more service identifications to the prepaid service node 104. Thus, the prepaid service node 104 may bill the prepaid mobile communication device 110 for use of the directory assistance service node 106. The prepaid service node 104 sends the Odisconnect return result 234 to the mobile switching center 102 to complete the disconnection.

Figure 5:
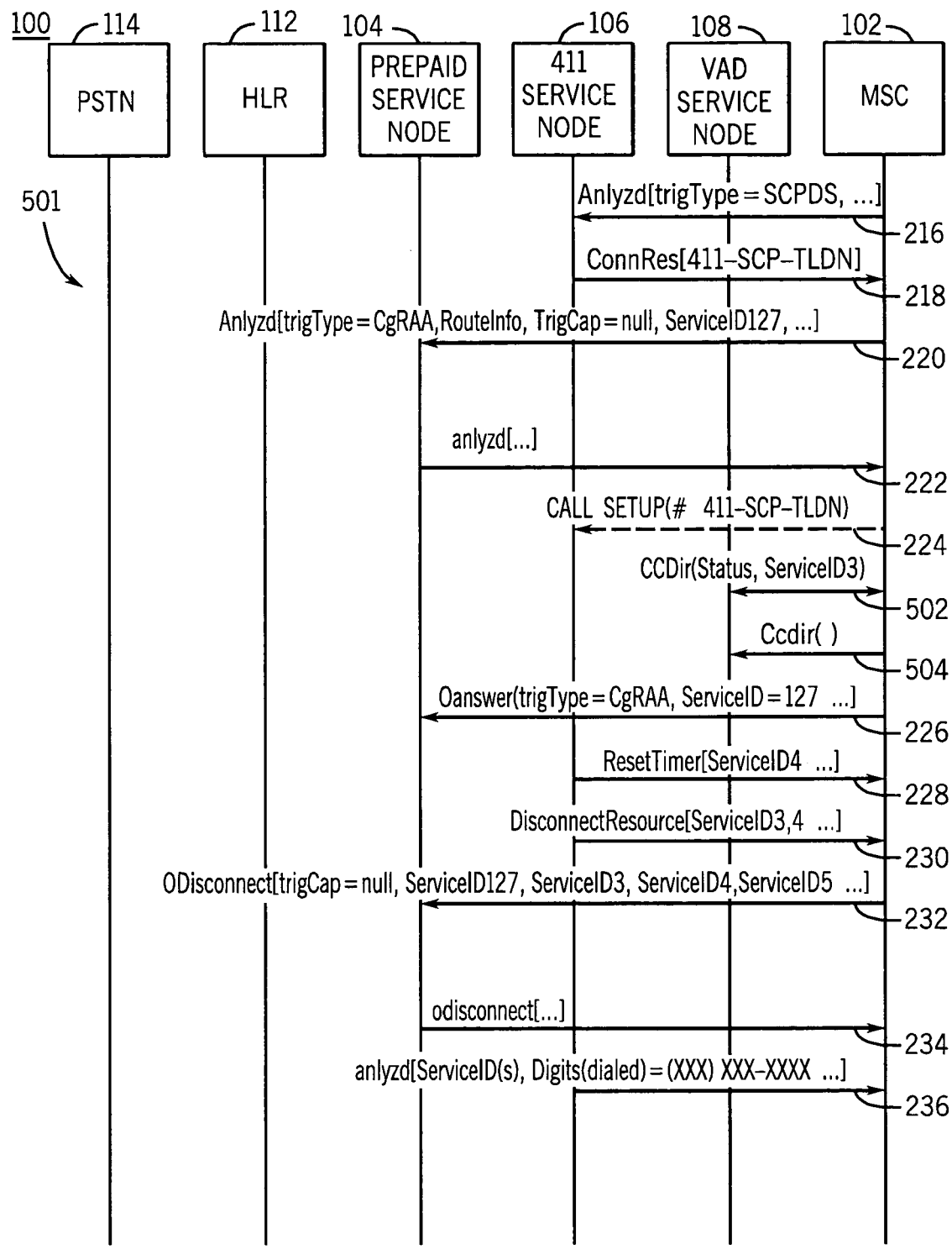
FIG. 5 is a representation of another exemplary message flow for teardown of a call that involves a prepaid mobile communication device of the prepaid mobile communication devices of the apparatus of FIG. 1.

Referring to FIGS. 1 and 5, a message flow 501 represents another exemplary teardown of a call that involves the prepaid mobile communication device 110. The message flow 401 illustrates registration, communication session setup, and use of the directory assistance service node 106 analogously to the message flow 201 (FIG. 2).

The voice activated dialing service node 108 may employ a call control directive 502 to request a status of the communication session from the mobile switching center 102. The mobile switching center 102 may respond with the status in a call control directive return result message 504. The call control directive 502 in one example comprises a service identification that indicates receipt of a service by the prepaid mobile communication device 110. The mobile switching center 102 stores the service identification with one or more other service identifications to later send to the prepaid service node 104. For example, the mobile switching center includes the service identifications in the Odisconnect trigger 232 to the prepaid service node 104. The prepaid service node 104 may then employ the service identifications to determine services used during the communication session. Thus, the prepaid service node 104 may calculate billing information for the prepaid mobile communication device 110.

The apparatus 100 in one example comprises a plurality of components such as electronic components, computer hardware components, and/or computer software components. A number of such components can be combined or divided in the apparatus 100. An exemplary component of the apparatus 100 employs and/or comprises a set and/or series of computer instructions written in or implemented with any of a number of programming languages, as will be appreciated by those skilled in the art.

The apparatus 100 in one example employs one or more computer-readable signal-bearing media. One example of a computer-readable signal-bearing medium for the apparatus 100 comprises one or more instances of the recordable data storage medium of one or more of the mobile switching center 102, the prepaid service node 104, and the service nodes 106 and 108. For example, the recordable data storage medium comprises one or more of a magnetic, electrical, optical, biological, and atomic data storage medium. In another example, a computer-readable signal-bearing medium for the apparatus 100 comprises a modulated carrier signal transmitted over a network comprising or coupled with the apparatus 100, for instance, one or more of a telephone network, a local area network ("LAN"), the internet, and a wireless network.

The steps or operations described herein are just exemplary. It will be apparent to those skilled in the relevant art that similar functionality can be achieved using protocols, such as Global System for Mobile communications ("GSM")/Customized Applications for Mobile network Enhanced Logic ("CAMEL"), ANSI Capability Set 1 ("CS-1"), International telecommunication union ("ITU-T") CS-1, and session initiation protocol ("SIP"), by variations of the steps and operations without departing from the spirit of the invention. For instance, the steps may be performed in a differing order, with similar operations, or steps may be added, deleted, or modified.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

We claim:

1. An apparatus, comprising:
a mobile switching center that supports a prepaid mobile communication device on a communication session;
wherein the mobile switching center connects the prepaid mobile communication device with an intelligent peripheral component to provide a service to the prepaid mobile communication device during the communication session; and
wherein the mobile switching center receives a service identification associated with the service from the intelligent peripheral component; and
wherein the mobile switching center generates one or more triggered operations to a prepaid service node to send the service identification to the prepaid service node; and
wherein the mobile switching center compiles a list of a plurality of service identifications received during the communication session from one or more service nodes that provided services to the prepaid mobile communication device; and
wherein the mobile switching center later sends the list of the plurality of service identifications to the prepaid service node to facilitate calculation of an amount to bill the prepaid mobile communication device for use of the services associated with the plurality of service identifications.

2. The apparatus of claim 1, wherein the prepaid service node comprises a first service node, and wherein the intelligent peripheral component is part of a second service node.

3. The apparatus of claim 2, wherein upon receipt of a connect resource operation from the second service node, the mobile switching center triggers a connection between the prepaid mobile communication device and the intelligent peripheral component.

4. The apparatus of claim 2, wherein the service identification is employable by the prepaid service node to calculate billing information based on use of the second service node by the prepaid mobile communication device.

5. The apparatus of claim 4, wherein the prepaid mobile communication device incurs a fee during use of the second service node; and
wherein the mobile switching center sends the service identification to the prepaid service node to facilitate a deduction of the fee from an account balance associated with the prepaid mobile communication device.

6. The apparatus of claim 4, in combination with the second service node;
wherein the second service node provides the service to the prepaid mobile communication device during the communication session; and
wherein the second service node sends the service identification to the mobile switching center to indicate involvement of the second service node on the communication session.

7. The apparatus of claim 6, wherein the mobile switching center stores an indication of the service identification for delivery to the prepaid service node upon disconnection of the communication session.

8. The apparatus of claim 4, wherein the prepaid mobile communication device sends a dialed digits value to the mobile switching center to initiate the communication session, and wherein the mobile switching center sends the dialed digits value to to prepaid service node; and
wherein the digits dialed value does not provide the prepaid service node with an indication of one or more billable activities of the communication session; and wherein the mobile switching center sends one or more service identifications to the prepaid service node to indicate the one or more billable activities that occurred on the communication session.

9. The apparatus of claim 2, in combination with the second service node;
wherein upon registration of the prepaid mobile communication device, the mobile switching center arms one or more call triggers set to send event information to the prepaid service node; and
wherein the second service node indicates to the mobile switching center that the one or more call triggers are active for transactions with the second service node.

10. The apparatus of claim 2, wherein upon registration of the prepaid mobile communication device, the mobile switching center arms a disconnect trigger set to send event information to the prepaid service node; and
wherein upon activation of the disconnect trigger, the mobile switching center sends a disconnect message to the prepaid service node; and
wherein the disconnect message carries to the prepaid service node one or more service identifications that are associated with one or more services that the prepaid mobile communication device received during the communication session.

11. The apparatus of claim 10, wherein the disconnect message provides an indication to the prepaid service node of a duration of a connection between the prepaid mobile communications device and the intelligent peripheral component.

12. The apparatus of claim 2, wherein upon receipt of a call termination request from the prepaid service node, the mobile switching center sends a disconnect message to the prepaid service node to pass one or more service identifications that are associated with one or more services that the prepaid mobile communication device received during the communication session.

13. The apparatus of claim 2, wherein the second service node comprises a directory assistance service node, and wherein the service identification comprises a directory assistance service identification associated with the directory assistance service node; and
wherein the prepaid mobile communication device sends a dialed digits value to the mobile switching center to initiate the communication session with the directory assistance service node, wherein the mobile switching center sends the dialed digits value to the prepaid service node; and
wherein the digits dialed value does not provide the prepaid service node with an indication of the use of the directory assistance service node by the prepaid mobile communication device; and
wherein the directory assistance service node sends the directory assistance service identification to the mobile switching center to indicate the use of the directory assistance service node by the prepaid mobile communication device; and
wherein the mobile switching center sends, the directory assistance device identification to the prepaid service node to facilitate a deduction of an amount from an account balance associated with the prepaid mobile communication device based on the use of the directory assistance service node.

14. The apparatus of claim 1, wherein the service identification comprises a first service identification, and wherein the mobile switching center receives a second service identification that is associated with the prepaid service node; and
wherein the mobile switching center compares an address associated with the second service identification and a trigger destination address for a destination to send the second service identification; and
wherein the mobile switching center determines to not send the second service identification to the trigger destination address if the address associated with the second service identification is the same as the trigger destination address.

15. The apparatus of claim 1, wherein the service identification comprises a first service identification, and wherein the mobile switching center receives a request for a status of the communication session and wherein the request comprises a second service identification; and
wherein the mobile switching center returns an indication of the status of the communication session; and
wherein the mobile switching center stores the second service identification to later send to the prepaid service node.

16. The apparatus of claim 1, wherein the mobile switching center employs International Telecommunication Union signaling in accordance with International Telecommunication Union standards.

17. The apparatus of claim 1, wherein the service comprises a first service provided by the intelligent peripheral component, and wherein the intelligent peripheral component provides a second service to the prepaid mobile communication device during the communication session; and
wherein the service identification comprises a first service identification associated with the first service, and wherein the mobile switching center receives a second service identification associated with the second service from the peripheral component; and
wherein the mobile switching center sends both the first service identification and the second service identification to the prepaid service node to facilitate calculation of an amount to bill the prepaid mobile communication device for use of the first service and the second service.

18. A method, comprising the steps of:
connecting a prepaid mobile communication device with an intelligent peripheral component to provide one or more services to the prepaid mobile communication device; and
sending one or more service identifications in a triggered operation to a prepaid service node for billing the prepaid mobile communication device for the one or more services received during connection with the intelligent peripheral component;
wherein the prepaid service node comprises a first service node, and wherein the intelligent peripheral component is part of a second service node, and wherein the second service node provides the one or more services to the prepaid mobile communication device during a communication session that involves the second service node; and
wherein the step of sending the one or more service identifications in the triggered operation to the prepaid service node for billing the prepaid mobile communication device for the one or more services received during connection with the intelligent peripheral component comprises the steps of:

receiving, from the second service node, the one or more service identifications that indicate involvement of the second service node on the communication session; and encountering a disconnect trigger for the connection with the intelligent peripheral component which sends a disconnect message to the prepaid service node, wherein the disconnect message carries the one or more service identifications to the prepaid service node.

19. The method of claim 18, wherein the step of sending the one or more service identifications in the triggered operation to the prepaid service node for billing the prepaid mobile communication device for the one or more services received during connection with the intelligent peripheral component further comprises the steps of:

arming one or more call triggers for a communication session that involves the prepaid mobile communication device and the intelligent peripheral component; and sending the triggered operation to the prepaid service node upon activation of one or more of the one or more call triggers.

20. A method, comprising the steps of:

connecting a prepaid mobile communication device with an intelligent peripheral component to provide one or more services to the prepaid mobile communication device; and sending one or more service identifications in a triggered operation to a prepaid service node for billing the prepaid mobile communication device for the one or more services received during connection with the intelligent peripheral component;

receiving a dialed digits value from the prepaid mobile communication device that initiates a communication session with the intelligent peripheral component; and sending the dialed digits value to the prepaid service node, wherein the digits dialed value does not provide the prepaid service node with an indication of one or more billable activities of due communication session; and wherein the step of sending the one or more service identifications in the triggered operation to the prepaid service node for billing the prepaid mobile communication device for the one or more services received during connection with the intelligent peripheral component comprises the step of;

sending the one or more service identifications to the prepaid service node to indicate the one or more billable activities that occurred on the communication session.

21. The method of claim 20, further comprising the steps of:

receiving a service identification that is associated with the prepaid service node;

comparing an address associated with the service identification and a trigger destination address for a destination to send the service identification;

determining to not send the service identification to the trigger destination address if the address associated with the service identification is the same as the trigger destination address.

22. An article, comprising:

one or more computer-readable signal-bearing media;

means in the one or more media for connecting a prepaid mobile communication device with an intelligent peripheral component to provide one or more services to the prepaid mobile communication device; and means in the one or more media for sending one at more service identifications in a triggered operation to a prepaid service node for billing the prepaid mobile communication device for the one or more services received during connection with the intelligent peripheral component;

means in the one or more media for receiving a dialed digits value from the prepaid mobile communication device that initiates a communication session with the intelligent peripheral component; and means in the one or more media for sending the dialed digits value to the prepaid service node, wherein the digits dialed value does not provide the prepaid service node with an indication of one or more billable activities of the communication session;

wherein the means in the one or more media for sending the one or more service identifications in the triggered operation to the prepaid service node for billing the prepaid mobile communication device for the one or more services received during connection with the intelligent peripheral component comprising:

means in the one or more media for sending the one or more service identifications to the prepaid service node to indicate the one or more billable activities that occurred on the communication session.

23. A method, comprising the steps of:

connecting a prepaid mobile communication device with an intelligent peripheral component to provide one or more services to the prepaid mobile communication device; and sending one or more service identifications in a triggered operation to a prepaid service node for billing the prepaid mobile communication device for the one or more services received during connection with the intelligent peripheral component;

wherein the prepaid service node comprises a first service node, and wherein the intelligent peripheral component is part of a second service node, and wherein the one or more services provided to the prepaid mobile communication device by the second service node comprise a first service and a second service; and wherein the step of sending the one or more service identifications in the triggered operation to the prepaid service node for billing the prepaid mobile communication device for the one or more services received during connection with the intelligent peripheral component comprises the steps of:

receiving a first service identification associated with the first service from the second service node;

receiving a second service identification associated with the second service from the second service node;

saving indications of the first service identification and the second service identification;

sending the indications of the first service identification and the second service identification to the prepaid service node to facilitate calculation of an amount to bill the prepaid mobile communication device for use of the first service and the second service.

* * * * *